Figure 6:
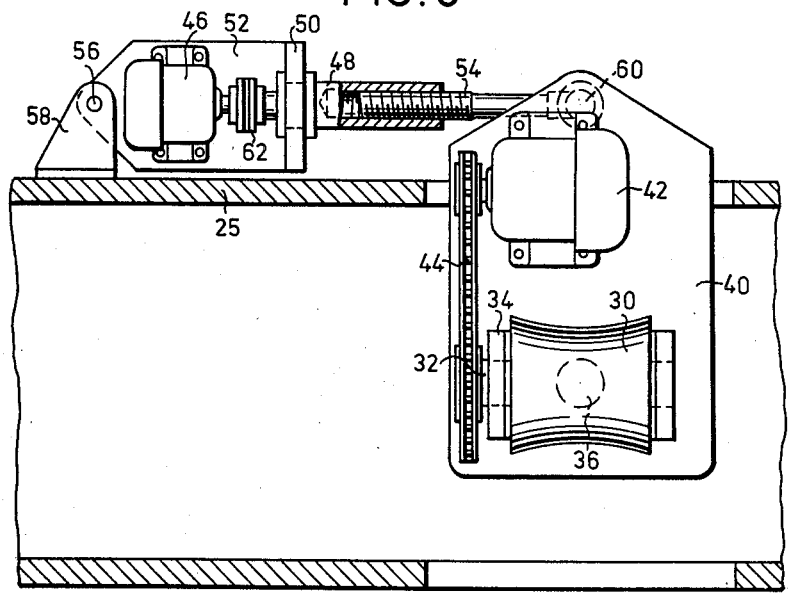

May 4, 1965
K. A. W. PERSSON
3,182,171
TUBE WELDING MACHINE
Filed Nov. 19, 1962
3 Sheets-Sheet 1
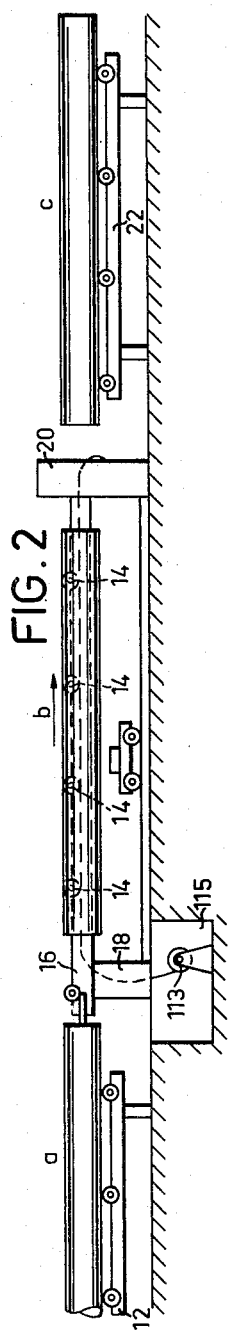
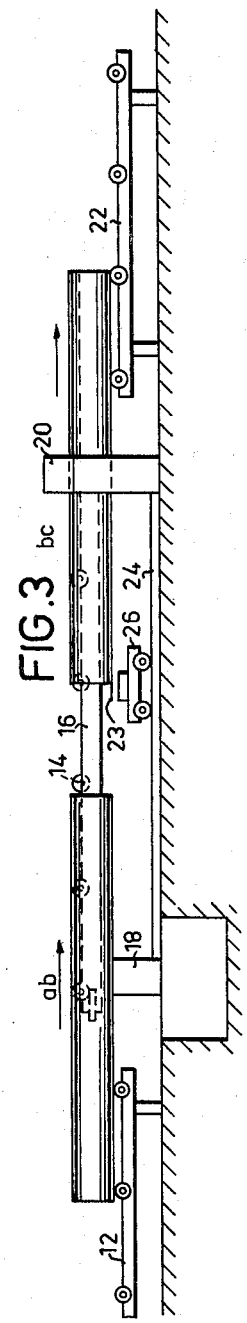
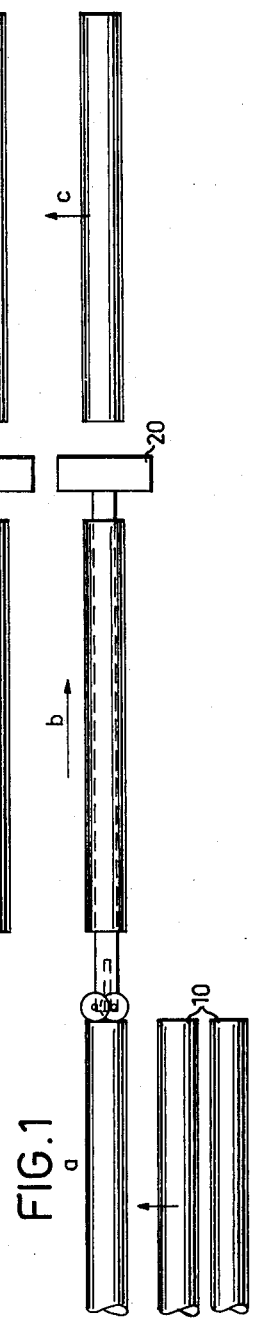
INVENTOR.
KNUT AXEL WALDEMAR PERSSON
BY Irvin S. Thompson
ATTORNEY.

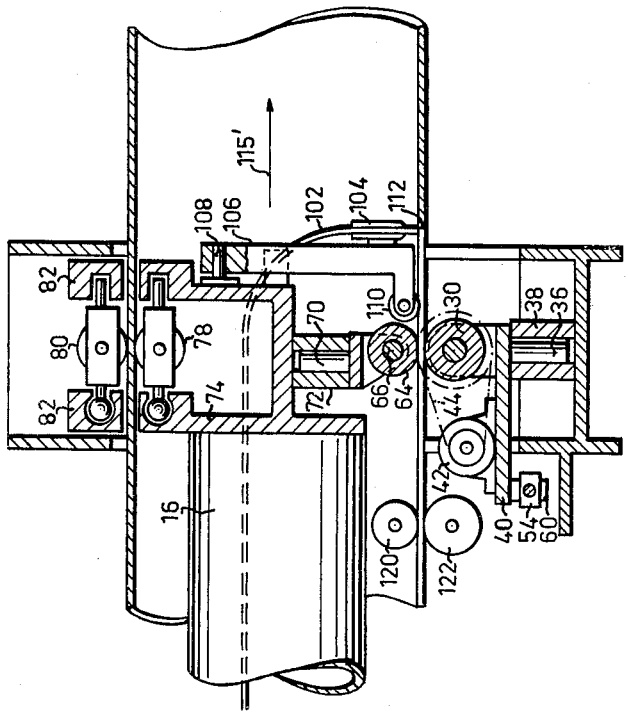

May 4, 1965  K. A. W. PERSSON  3,182,171
TUBE WELDING MACHINE
Filed Nov. 19, 1962  3 Sheets-Sheet 3

INVENTOR.
KNUT AXEL WALDEMAR PERSSON
BY Irvin S. Thompson
ATTORNEY.

United States Patent Office 3,182,171
Patented May 4, 1965

3,182,171
TUBE WELDING MACHINE
Knut Axel Waldemar Persson, Trollbacken, Sweden, assignor to AB Bröderna Hedlund, Stockholm, Sweden, a corporation of Sweden
Filed Nov. 19, 1962, Ser. No. 238,386
Claims priority, application Sweden, Dec. 15, 1961, 12,557
11 Claims. (Cl. 219—60)

This invention relates to tube or pipe manufacturing machines of the type in which a tube or pipe blank in the form of a sheet metal strip which has previously been bent into tubular shape such that the longitudinal axis of the tube is parallel to the longitudinal direction of the sheet metal strip, has its longitudinal edges united by welding according as the edges to be joined are moved together by application of a clamping pressure. In machines of this kind it is previously known to provide a plurality of clamping rolls around the tube blank in a frame which during the longitudinal movement of the tube blank for welding the same can turn the tube to the correct position relative to the welding apparatus if the tube has been dislocated. The peripheral surfaces of the clamping rolls engaging the tube are shaped in the form of a circular arc such that the rolls approximately entirely surround the tube. Adjustment of the tube is effected by turning the entire frame which carries the clamping rolls. This device is comparatively complicated and not always reliable.

The main object of the invention is to provide a tube welding machine which comprises a simple device for steering and feeding the tube blank which device operates entirely automatically or by the use of simple means can be devised in a manner such that the tube blank is automatically steered relative to a welding electrode or other welding means such that the edges to be joined always will assume their correct positions relative to the welding apparatus.

In its broadest aspect the invention is characterized in that the device by means of which the tube blank is maintained in proper angular position is constructed for combined feeding and steering of the tube blank, the steering and feeding operation being performed by means of a single roll which is in engagement with the periphery of the tube blank and connected to a driving motor for feeding the blank and mounted in a carrier which is adjustable about an axis extending transversely of the blank. A steering motor can be provided to adjust the carrier by means of simple structure in response to impulses from a feeler, for example by means of a screw and a nut which are arranged such that turning movement of the screw relative to the nut results in a turning movement of the carrier about an axis extending transversely of the tube blank.

Figure 7:
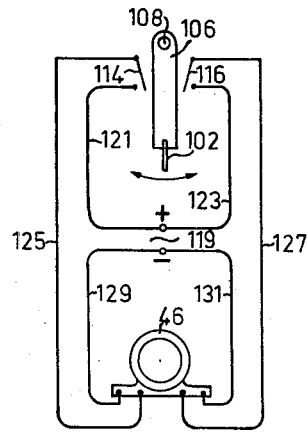

Further characteristic features of the invention and advantages obtained thereby will appear from the following description of an embodiment illustrated in the annexed drawings. FIG. 1 is a top view of a working scheme. FIGS. 2 and 3 are side elevations of a welding plant and conveyors. FIG. 4 is an enlarged end view of a welding station with a tube during the welding operation. FIG. 5 a longitudinal sectional view corresponding to FIG. 4, and FIG. 6 a top view of the combined feeding and steering device. FIG. 7 illustrates an electric circuit diagram.

FIG. 1 is a top view which diagrammatically illustrates the mode of operation in welding a tube blank, whereas FIGS. 2 and 3 are side elevations illustrating different steps of the welding operation.

The tube or pipe blank is taken from a stock 10 on the left side in FIGS. 1 and 2 and is lifted by a suitable conveyor, such as a telpher line, onto a roller conveyor 12 on which the tube blank takes the position $a$. The tube blank is moved to a position $b$ along the roller conveyor 12 and over a horizontal bar 16 provided with rolls 14 and resting on a laterally narrow support or knife 18 which is resilient to some extent such that the front end of the bar is slightly movable up and down during elastic deformation of the knife. During movement of the tube blank on the bar, the knife 18 extends through the gap existing between the edges of the tube blank before these edges are welded together and bar 16 and rolls 14 are disposed within the tube blank. Numeral 20 denotes a welding station in which the tube blank is welded on the inside. In the position $c$ the weld joint on the inside is finished and the tube rests on a roller conveyor 22. FIG. 3 illustrates a tube blank in an intermediate position $ab$, where it is about to be moved onto the bar 16, and in another intermediate position $bc$ in which the longitudinal joint is welded on the inside. In order to obtain a satisfactory weld even at the places where the joint starts and ends, that is, at the end edges of the tube blank, it is suitable to begin and end the welding of each tube blank at a so-called connecting strip 23 which has a longitudinal slot in alinement with the gap between the edges of the tube blank. The connecting strip may be welded to the blank by means of devices on a carriage 26 running on rails 24. It is also possible to secure the rear end of a connecting strip attached to a tube blank to the front end of a succeeding tube blank, in order to render possible continuous welding from tube to tube. After the tube has been welded on the inside it is welded also on the outside. To this end, it may be moved transversely to a position $c'$ and welded in a welding station 21 during longitudinal movement to a position $d$ where the welding operation has been completed.

The welding station 20 illustrated in FIGS. 4 and 5 comprises a gate-like frame 25 having an opening 27 for the tube blanks 28 to be welded, and a guiding and feeding device for the blanks as well as clamping devices for exerting pressures on the tube blank from the outside and for moving together the longitudinal edges to be joined by application of forces directed substantially radially inwards.

The guiding and feeding device consists of a roll 30 which supports the tube blank from below and is keyed onto a shaft 32 mounted in a carrier 34. The carrier is provided with a pivot 36 which extends downwards into a bearing 38 secured to the lower part of the frame. Consequently, the carrier can turn about an axis extending radially of the tube blank when the latter assumes its correct position on the roll 30. The shaft 32 is located transversely of the tube and at right angles to the pivot 36. The carrier 34 is formed with a plate 40 (FIGS. 5 and 6) which carries a motor 42 which by means of a chain gear 44 or other transmission is connected to the shaft 32 of the roll 30. Revolution of the roll 30 by means of the motor 42 results in a longitudinal forward movement of the tube blank resting on the roll 30. The tube can be guided by turning the carrier 34 and its pivot 36 in the bearing 38, that is, about an axis extending radially of the tube blank. The guiding movements can be obtained by means of a motor 46 and a gearing diagrammatically illustrated in FIG. 6. The gearing consists generally of a nut sleeve 48 mounted on a projecting part 50 of a plate 52, and a screw 54 extending into the nut sleeve 48 and co-operating with the threads thereof. The plate 52 which carries the motor 46 is pivotally mounted on a shaft 56 connected to a bracket 58 which is secured to the frame 25 of the machine. The screw 54 is articulated to the plate 40 by means of a pivot 60 secured to this plate. The nut sleeve 48 is connected to the motor 46 by means of clutch 62. The motor 46 may be a reversible gear motor and is operated by means of devices described hereinbelow.

In order to maintain the longitudinal edges of the tube blank 28 to be welded together in correct positions relative to each other, a pressure roll 64 (FIGS. 4 and 5) provided on the inside of the tube blank engages the edges thereof from above. The roll 64 is rotatable on a shaft 66 mounted in yoke 68 which is provided with a pivot 70 extending upwardly radially of the tube blank and mounted in a bearing sleeve 72. This sleeve 72 is attached to a bracket 74 which forms the front end of the bar 16. The shaft 66 extends at right angles to the pivot 70 and is located ahead of the pivot such that during longitudinal movement of the tube blank the roll 64 like a caster will automatically adjust itself to its correct position. The bracket 74 carries a pair of swivelled rolls 76 and 78 which bear upon the inside of the tube blank. In engagement with the upper outside of the tube blank is a pair of clamping rolls 80 which are rotatable each about two shafts mounted at right angles to each other on individual levers 82 which are hinged on pivots 84 secured to the frame of the machine. The pivots 84 carry the levers at one end thereof, and the other ends of the levers are acted upon by members operated by air under pressure. Each of said members may consist of a cylinder 86 and a piston 88. The cylinder is secured to the frame and the piston bears on the lever so that it can turn the lever inwards toward the tube blank to force the roll 80 into engagement with the blank. As a result, the tube blank is subjected from above to a clamping action which by means of the rolls 76 and 78 is transmitted to the bar 16 and therefrom to the yoke 68 and the roll 64. As mentioned above the bar is slightly flexibly mounted. Consequently, the pressure exerted from above results in that the roll 64 will be forced down sufficiently strongly toward the edges of the tube blank so that these edges will be maintained in opposite positions on the roll 30 and a frictional engagement will be obtained between the tube blank and the roll 30, said frictional engagement being sufficient to feed and guide the tube blank by means of this roll. In order to force the edges to be joined toward each other, there are provided lateral clamping rolls 90 and 92 on both sides of the tube blank where they are mounted each on shafts disposed at right angles to each other on pivoted arms 94 which are centrally hinged upon levers 96 pivotally mounted on the frame 25 at 98. The pivots 98 carry the levers 96 at one of their ends, whereas their other ends are acted upon each by a device, such as a pneumatic ram 100 adapted to exert an inward pressure upon the lever and to turn the lever and the pivoted arms 94 inward toward the pipe blank so as to have the lateral clamping rolls 90, 92 force opposite sides of the tube blank toward each other at places located symmetrically with respect to the weld joint. One of the two shafts about which the supporting and clamping rolls are rotatable extends longitudinally of the tube blank and the other one transversely thereof, so that the rolls will adjust themselves automatically in correct positions relative to the tube blank during longitudinal movement thereof.

In the embodiment exemplified the welding operation is assumed to be performed by electric arc welding with the use of an additional material. However, other welding methods are possible with corresponding modification of the welding apparatus.

The electrode wire 102 is fed to the weld area 112 from a supply roll 113 provided in a pit 115 below the knife 18. From the roll 113 the wire is moved upward through the knife 18 and forward through the bar 16 which is in the form of a tube and also contains cables (not shown) for the supply of electric current, and, if desired, means for the supply of flux to the weld area. The wire 102 constitutes one pole of the welding apparatus. The other pole is the feeding roller 30. The wire 102 passes through a holder 104 secured to an arm 106 which is mounted for turning movement on a horizontal pivot 108 on the front side of the bracket 74. Mounted on the lower end of the arm 106 is a feeler preferably a sharp-edged wheel 110 which rearwardly of the weld area 112 projects into the gap between the edges of the tube blank which are bevelled on the inside. The arm 106 extends downward centrally between a pair of contact members 114, 116 which project from the front side of the bracket 74 and which connect to the reversible motor 46 as shown in FIG. 7, in which 119 denotes a source of current. 121, 123 are leads connecting one pole of this source with one terminal of the contact members 114, 116, which have their other terminal connected with one terminal of the windings of the motor 46 by leads 125 and 127. The other pole of the source of current 119 is connected with the other terminal of the windings of the motor by leads 129, 131.

As will be seen from FIG. 5 the weld area 112 is located somewhat behind the places of engagement of the feeding roll 30 and the pressure roll 64. In view thereof the edges to be joined may be slightly displaced vertically relative to each other ahead of the weld area. This may happen particularly if the tube blank consists of a comparatively thin metal sheet in which case the edges to be joined tend to overlap each other before they enter the machine. In order to prevent this vertical displacement of the edges, two pressure rolls 120, 122 provided immediately ahead of the roll 30 maintain the edges to be joined in correct positions opposite each other.

The mode of operation of the tube welding machine described is substantially as follows. The tube blank is advanced longitudinally in the direction of the arrow 115′, FIG. 5, and the edges are successively welded together starting at one end of the tube according as they pass the welding electrode 102. The tube is advanced by means of the roll 30 which via the chain transmission 44 is rotated by the motor 42. The required engagement between the tube blank and the feeding roll 30 is established, in the manner described, by means of the roll 64 and the other clamping and supporting rolls. As long as the edges to be joined are moving axially centrally with respect to the electrode the feeding roll 30 assumes an exactly central position with its shaft 32 extending transversely of the tube. If during the welding operation the tube turns about its longitudinal axis, the arm 106 guided by the wheel 110 will be swung toward the contact member 114 or 116 depending upon the direction in which the tube turns. For example, if the tube turns in a clockwise direction as viewed in FIG. 4, the arm 106 will engage the contact 114 and close a circuit from the positive pole of 119 (FIG. 7) through lead 121, contact member 114, lead 125, one winding of the motor 46 and lead 129 to the negative pole of 119. The motor 46 then is started in a one direction and rotates the nut sleeve 48 with the result that the screw 54 will be screwed into the sleeve and the plate 40 will be turned counterclock-wise, as viewed in FIG. 6 around the axis formed by the pivot 36 and the bearing sleeve 38. As a result thereof, the tube moving on the roll 30 will be guided and turned back to its central position. A corresponding return movement to the correct position will be obtained if the tube has turned counterclock-wise, as viewed in FIG. 4. In that case the contact member 116 is engaged and the screw 54 will be screwed farther out of the sleeve 48 as a result of the opposite direction of rotation of the motor 46.

While the drawing illustrates welding of the joint from inside of the tube only it is possible to weld the tube on the outside as well by means of devices of generally the same type. To this end, the tube is first turned about its longitudinal axis through an angle of 180° so that the welded joint is facing upwards. In other respects the invention is not limited to the devices illustrated which merely explain the general principle. They may be varied and supplemented in various manners. For instance, a device for manual control of the feed speed may be added to the driving devices for the feeding and steering roll 30.

What is claimed is:

1. A machine for uniting the longitudinal edges of a tube blank of sheet metal bent to substantially tubular shape, comprising a frame defining a passage for the tube blank, welding means near said passage, a combined feeding and steering roll mounted to support the tube blank at the lowest point thereof and at both margins being welded, a carrier for said roll mounted in the frame for rotation about an axis extending substantially transversely to the longitudinal direction of the tube blank, a driving motor for said roll, said driving motor being supported by said carrier, a feeler sensitive to turning of the tube blank about its longitudinal axis, and means controlled by said feeler and operative to move said carrier about its substantially transverse axis for imparting steering movements to the roll as the roll advances the tube blank past said welding means.

2. A machine for uniting the longitudinal edges of a tube blank of sheet metal bent to substantially tubular shape, comprising a frame defining a passage for the tube blank, welding means in said passage, a combined feeding and steering roll adapted to carry a tube blank at the outer periphery thereof, a carrier for said roll mounted in the frame for rotation about an axis extending substantially transversely to the longitudinal direction of the tube blank to enable rotation of the tube blank by angular adjustment of said roll about said axis, a driving motor for said roll, said driving motor being supported by said carrier, a feeler sensitive to turning of the tube blank about its longitudinal axis, and a steering motor controlled by said feeler, and a screw and nut assembly connecting the shaft of the steering motor with a carrier to move said carrier about its substantially transverse axis as said shaft rotates with a view to imparting steering movements to the roll as the roll advances the tube blank past said welding means.

3. A machine for uniting the longitudinal edges of a tube blank of sheet metal bent to substantially tubular shape, comprising a frame defining a passage for the tube blank, welding electrode means for welding said edges, a combined feeding and steering roll adapted to support said tube blank in engagement with the outer periphery of said blank at both longitudinal margins thereof, a pressure roll located above said margins and adapted to force the latter against the feeding and steering roll to keep the edges of the blank in accurately opposed relation during welding, a carrier for said feeding and steering roll mounted in the frame for rotation about an axis extending substantially transversely to the longitudinal direction of the tube blank, a driving motor for the feeding and steering roll, said driving motor being supported by said carrier, a feeler sensitive to turning of the tube blank about its longitudinal axis, and means controlled by said feeler and operative to move said carrier about its substantially transverse axis for imparting steering movements to the feeding and steering roll as the latter advances the tube blank past said welding means.

4. A machine for uniting the longitudinal edges of a tube blank of sheet metal bent to substantially tubular shape, comprising a frame defining a passage opening for the tube blank, a supporting bar extending with an overhung end into said passage opening substantially in the longitudinal direction of the tube blank, an arm pivoted to said overhung end for turning about an axis parallel with the longitudinal axis of said bar, a feeler member carried by said arm for engagement between the edges of the tube blank and an electrode also carried by said arm, a combined feeding and steering roll for peripheral engagement with the tube blank, a carrier for said roll mounted in the frame for rotation about an axis extending substantially transversely to the longitudinal direction of the tube blank, means to drive said roll for feeding the tube blank past said electrode, supporting rolls mounted on said supporting bar for engagement with the inner periphery of the tube blank in positions substantially opposite to that of said feeding and steering roll and exterior clamping rolls mounted in the frame to apply pressure in substantially inward radial directions on the tube blank for pressing its longitudinal edges into abutment during its motion past said electrode.

5. A machine for uniting the longitudinal edges of a tube blank of sheet metal bent to substantially tubular shape, comprising a frame defining a passage opening for the tube blank, a supporting bar extending with an overhung end into said passage opening substantially in the longitudinal direction of the tube blank, an arm pivoted to said overhung end for turning about an axis parallel with the longitudinal axis of said bar, a feeler member carried by said arm for engagement between the edges of the tube blank, an electrode also carried by said arm, a combined feeding and steering roll for peripheral engagement with the tube blank, a carrier for said roll mounted in the frame for rotation about an axis extending substantially transversely to the longitudinal direction of the tube blank, means to drive said roll for feeding the tube blank past said electrode for welding the longitudinal edges, supporting rolls mounted on said supporting bar for engagement with the inner periphery of the tube blank in positions substantially opposite to that of said feeding and steering roll, levers pivoted to the frame, exterior lateral and top clamping rolls mounted on said levers, and pressure boxes actuating said levers to apply pressure thereto for pressing said clamping rolls in substantially radial directions against the tube blank with a view to pressing the longitudinal edges of said tube blank into abutment during its motion past said electrode.

6. A machine for uniting the longitudinal edges of a tube blank of sheet metal bent to substantially tubular shape, comprising welding means, means for feeding the blank axially with said edges adjacent the welding means, means for detecting rotation of the blank about its axis, and means responsive to said detecting means to rotate the blank about its axis in the opposite direction to maintain said edges adjacent the welding means.

7. A machine as claimed in claim 6, said rotating means comprising a roll for supporting the blank, said rotating means further comprising means for altering the angle of the axis of the roll relative to the axis of the blank.

8. A machine as claimed in claim 7, said feeding means comprising power means for rotating said roll about its axis.

9. A machine for uniting the longitudinal edges of a tube blank of sheet metal bent to substantially tubular shape, comprising welding means, means for feeding the blank axially with said edges adjacent the welding means, means for detecting the position of said edges, and means responsive to said detecting means upon lateral movement of said edges to rotate the blank about its axis in a direction to move said edges laterally in the opposite direction to maintain said edges adjacent the welding means.

10. A machine as claimed in claim 9, said rotating means comprising a roll for supporting the blank, said rotating means further comprising means for altering the angle of the axis of the roll relative to the axis of the blank.

11. A machine as claimed in claim 10, said feeding means comprising power means for rotating said roll about its axis.

(References on following page)

References Cited by the Examiner

UNITED STATES PATENTS

| | | | |
|---|---|---|---|
| 1,512,787 | 10/24 | Morton | 219—137 |
| 1,997,272 | 4/35 | Adams | 219—59 |
| 2,649,528 | 8/53 | Koenig et al. | 219—137 |
| 2,670,423 | 2/54 | Darner et al. | 219—60 |
| 2,837,626 | 6/58 | Buck et al. | 219—61 |
| 3,068,345 | 12/62 | Erlandson | 219—68 |

RICHARD M. WOOD, *Primary Examiner.*